US012766422B2

(12) United States Patent
Sedlock

(10) Patent No.: US 12,766,422 B2
(45) Date of Patent: Oct. 20, 2026

(54) CONTROLLER-DRIVEN VIDEO GAME CONSOLE LOGIN

(71) Applicant: Sony Interactive Entertainment Inc., Tokyo (JP)

(72) Inventor: Alicia Sedlock, Oakland, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 146 days.

(21) Appl. No.: 18/949,610

(22) Filed: Nov. 15, 2024

(65) Prior Publication Data

US 2026/0138032 A1 May 21, 2026

(51) Int. Cl.
*A63F 13/79* (2014.01)
*A63F 13/31* (2014.01)

(52) U.S. Cl.
CPC .............. *A63F 13/79* (2014.09); *A63F 13/31* (2014.09)

(58) Field of Classification Search
None
See application file for complete search history.

(56) References Cited

U.S. PATENT DOCUMENTS

| | | | | |
|---|---|---|---|---|
| 10,252,163 | B2 | 4/2019 | Chrzanowski, Jr. et al. | |
| 2004/0209690 | A1* | 10/2004 | Bruzzese | G07F 17/32 463/39 |
| 2005/0170889 | A1* | 8/2005 | Lum | H04W 84/22 463/39 |
| 2005/0221895 | A1* | 10/2005 | Lum | A63F 13/22 463/39 |
| 2006/0154712 | A1* | 7/2006 | Lum | A63F 13/235 463/43 |
| 2008/0146342 | A1* | 6/2008 | Harvey | A63F 13/10 463/42 |
| 2014/0213349 | A1* | 7/2014 | Lin | G06F 21/31 463/29 |
| 2017/0034234 | A1* | 2/2017 | Zimring | H04L 65/762 |
| 2018/0111047 | A1* | 4/2018 | Heppe | A63F 13/27 |
| 2018/0359246 | A1* | 12/2018 | Dannemiller | A63F 13/23 |
| 2019/0068667 | A1* | 2/2019 | Zimring | H04L 65/612 |
| 2020/0139231 | A1* | 5/2020 | Colenbrander | A63F 13/23 |
| 2020/0179803 | A1* | 6/2020 | Holmes | A63F 13/285 |
| 2022/0305376 | A1 | 9/2022 | Orion et al. | |
| 2024/0046747 | A1* | 2/2024 | Nelson | A63F 9/24 |

OTHER PUBLICATIONS

International Search Report and Written Opinion in International Appln. No. PCT/US2025/041918, mailed on Oct. 28, 2025, 12 pages.

* cited by examiner

*Primary Examiner* — Tramar Harper
(74) *Attorney, Agent, or Firm* — Fish & Richardson P.C.

(57) ABSTRACT

Techniques disclosed herein pertain to improving end user video game console experiences. Particularly, techniques are disclosed herein for controller-driven video game console login. In some examples, operating a video game controller includes receiving a first notification from a video game console. The first notification can indicate that a login event has occurred at the video game console. Based on the first notification, it can be detected that an electronic device is within a predetermined distance from the video game controller and a signal can be emitted from the video game controller. A second notification can be received from the electronic device, where the second notification indicates that the signal was received by the electronic device. Based on the second notification, a login credential for a video game player can be obtained and transmitted from the video game controller to the video game console.

20 Claims, 11 Drawing Sheets

CONTROLLER-DRIVEN VIDEO GAME CONSOLE LOGIN

BACKGROUND

Video game usage has become prevalent. Often end users will play video games on a portable electronic device such as their mobile phone and on a dedicated video game console. In the case of a mobile phone, video games can be operated using a touchscreen display and buttons of the mobile phone. In the case of a video game console, video games can be operated using an input device such as a video game controller. Keeping tracking of purchases, personal preferences, and game progress is a desirable feature.

BRIEF SUMMARY

Techniques disclosed herein pertain to video game consoles. Particularly, techniques disclosed herein pertain to improving video game consoles using controller-driven video game console login.

In some embodiments, a method for operating a video game controller includes: receiving a first notification from a video game console, the first notification indicating that a login event has occurred at the video game console, wherein the video game console is wirelessly coupled to the video game controller; based on the first notification, detecting that an electronic device is within a predetermined distance from the video game controller; based on the electronic device being within the predetermined distance from the video game controller, emitting a signal from the video game controller; receiving a second notification from the electronic device, the second notification indicating that the signal was received by the electronic device; based on the second notification, obtaining a login credential for a video game player; and transmitting the login credential from the video game controller to the video game console, wherein the transmitting of the login credential serves as a response to the login event.

In some embodiments, detecting that the electronic device is within the predetermined distance from the video game controller includes detecting a signal emitted from the electronic device.

In some embodiments, detecting that the electronic device is within the predetermined distance from the video game controller includes detecting that the electronic device is communicating with the video game controller using at least one of a Near Field Communication (NFC) protocol or a Bluetooth protocol.

In some embodiments, detecting that the electronic device is within the predetermined distance from the video game controller includes detecting that the electronic device has physically contacted the video game controller.

In some embodiments, the second notification further indicates that an application associated with a provider of the video game console is executing on the electronic device.

In some embodiments, the signal includes at least one of an audible signal emitted from an audio transducer of the video game controller, a visual signal emitted from a light emitting unit of the video game controller, a vibration signal emitted from a vibrating unit of the video game controller, or a combination thereof.

In some embodiments, obtaining the login credential for the video game player includes obtaining the login credential from at least one of a server storing login credentials for video game players or the electronic device.

Some embodiments include a video game controller that includes one or more processors and one or more computer-readable media storing instructions which, when executed by the one or more processors, cause the video game controller to perform part or all of the operations and/or methods disclosed herein.

Some embodiments include one or more non-transitory computer-readable media storing computer-readable instructions that, when executed by one or more processors, cause a video game controller to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
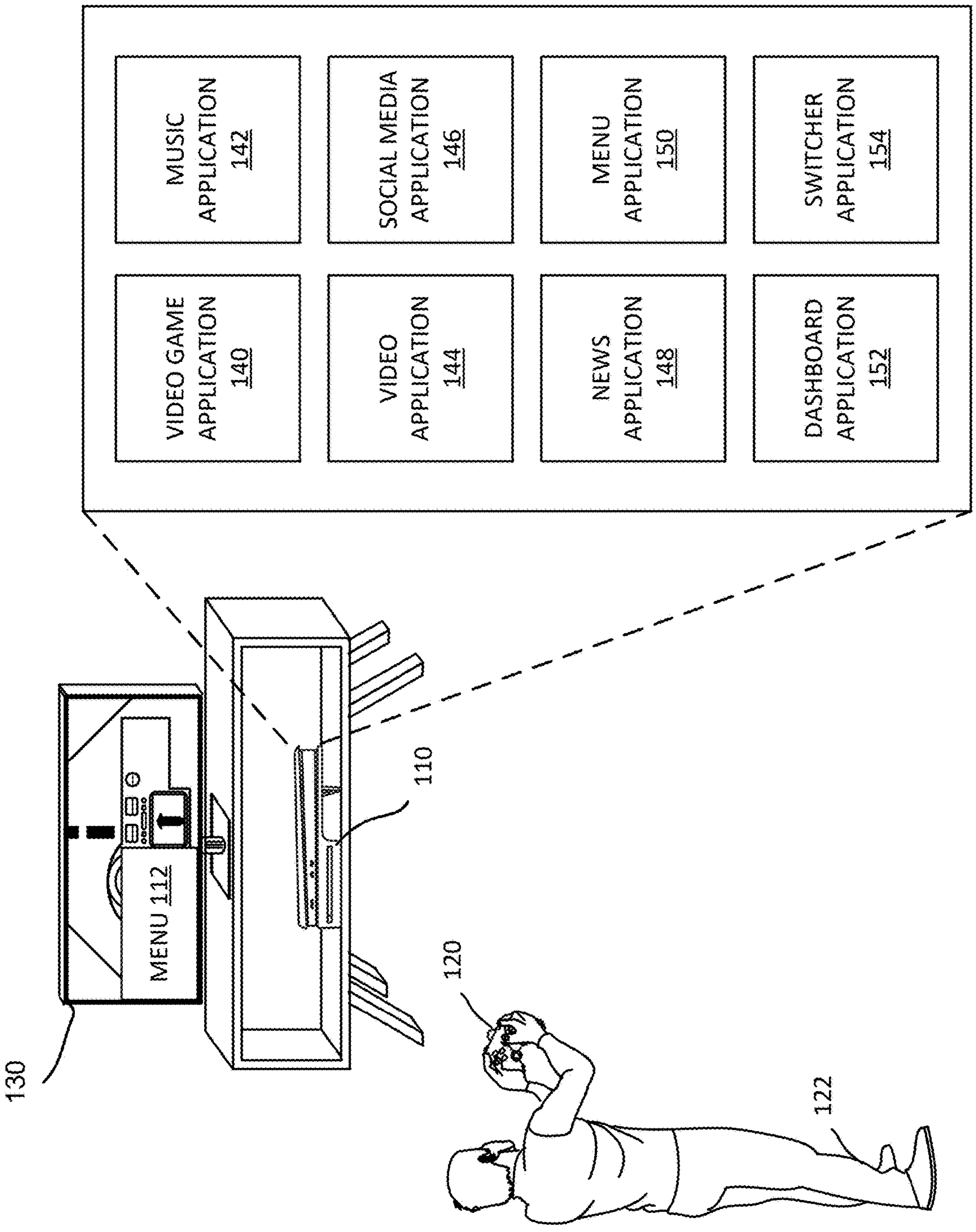
FIG. 1 illustrates a computer system that presents a dashboard, according to some embodiments of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Video game players have found it desirable to keep track of purchases such as a video game purchase, personal preferences such as a particular camera view, and game progress such as video game levels completed. Video game players have also found it desirable to collectively participate in a video game experience with other video game players. In response, various entities such as Sony Interactive Entertainment Inc. have provided portals for providing such features such as for establishing and managing online accounts, setting up video game consoles, storing and managing video game related data and information in the cloud, and the like. Use of these portals has facilitated many desirable features such as streamlining video game console setup, starting video game play on one electronic device such as a mobile phone and continuing video game play on another electronic device such as a video game console, preserving user preferences when playing a video game using different electronic devices and with video game players, and others.

To utilize these portals, video game consoles often offer login functionality where end users can log into the video game consoles and/or utilize the video game consoles to log into their accounts (e.g., accounts provided by video game providers, video game console providers, and the like). Traditionally, to facilitate and coordinate video game console login, video game consoles perform multiple operational steps using multiple devices. For example, to facilitate a log in, a video game console may perform one or more first communication operations with a video game controller and one or more second communication operations with a mobile phone or electronic keyboard. In another example, a video game console may launch a login screen of a software application executing on the video game console (e.g., a separate software application or a component of the operating system of the video console) in response to operations performed by a video game controller in communication with the video game console yet present a quick response code on a display for scanning and verification by a separate mobile device. In yet another example, the video game console may obtain login credentials from an electronic keyboard in communication with the video game console yet depend on the video game controller to navigate to and from a login screen.

However, facilitating and coordinating video game console login by performing multiple operational steps using multiple devices often causes performance of the video game console to suffer and/or one or more operations of the video game console to fail. For example, wireless communication challenges may cause communication between a video game console and one or more of the devices to fail thereby leading to failure of a login operation or one or more devices may be incompatible with the video game console and/or an operating system of the video game console thereby leading to a slowdown in a login process. In another example, coordinating multiple operations between multiple devices may cause processing components of a video game console to become overworked and/or overheat thereby causing processing slowdowns, limiting the video game console's ability to perform multiple overlapping operations, and, even video game console failure.

The techniques described herein overcome the foregoing challenges and others by providing controller-driven video game console login. Particularly, techniques disclosed herein improve video game consoles and video game console performance with controller-driven video game console login. In some implementations, a video game controller can be operated, and operating a video game controller can include receiving a first notification from a video game console. The video game console can be wirelessly coupled to the video game controller, and the first notification can indicate that a login event has occurred at the video game console. The login event can correspond to a login inquiry generated by the video game console for logging into the video game console and/or logging into a video game executing on the video game console. Based on the first notification, the video game controller can detect that an electronic device is within a predetermined distance from the video game controller, and, based on the electronic device being within the predetermined distance from the video game controller, the video came controller can emit a signal. In some implementations, the video game controller can detect that the electronic device is within the predetermined distance from the video game controller by, in some examples, detecting a signal emitted from the electronic device, using a communication protocol such as a Near Field Communication (NFC) protocol and/or a Bluetooth protocol, detecting that the electronic device has physically contacted the video game controller, and a combination thereof. In some implementations, the signal can include at least one of an audible signal emitted from an audio transducer of the video game controller, a visual signal emitted from a light emitting unit of the video game controller, a vibration signal emitted from a vibrating unit of the video game controller, or a combination thereof. A second notification can be received from the electronic device. The second notification can indicate that the signal was received by the electronic device and/or that an application associated with a provider of the video game console is executing on the electronic device. Based on the second notification, a login credential for a video game player can be obtained, and the login credential can be transmitted from the video game controller to the video game console. In some implementations, obtaining the login credential for the video game player includes obtaining the login credential from at least one of a server storing login credentials for video game players or the electronic device. The transmitting of the login credential can serve as a response to the login event. In this way, the video game console can use the login credential to authenticate a video game player and/or add a video game player to a video game.

By using the techniques described herein, video game consoles can be improved. Particularly, by providing controller-driven video game console login, the challenges involved with the traditional techniques can be overcome. For example, by providing controller-driven video game console login, the number of devices and the number of operational steps performed by the video game console can reduced, thereby simplifying the operations performed by the video game console and reducing the likelihood of failure of any one operation of video game console performance. Additionally, by providing controller-driven video game console login, the opportunity for device communication failures and processing overload can be reduced, thereby reducing the likelihood of processing slowdowns and/or video game console failure.

FIG. 1 illustrates a computer system that presents a dashboard, according to an embodiment of the present disclosure. As illustrated, the computer system includes a video game console 110, a video game controller 120, and a display 130. Although not shown, the computer system may also include a backend system, such as a set of cloud servers, that is communicatively coupled with the video game console 110. The video game console 110 is communicatively coupled with the video game controller 120 (e.g., over a wireless network) and with the display 130 (e.g., over a communications bus). A video game player 122 operates the video game controller 120 to interact with the video game console 110. These interactions may include playing a video game presented on the display 130, interacting with a dashboard 112 presented on the display 130, and interacting with other applications of the video game console 110 (e.g., with media applications to stream media from an online content source or to play a media file from the local storage of the video game console 110).

The video game console 110 includes one or more processors and one or more memories (e.g., a non-transitory computer-readable storage medium) storing computer-readable instructions that can be executed by the one or more processors and that, upon execution by the one or more processors, cause the video game console 110 to perform various operations (e.g., operations related to various applications). In particular, the computer-readable instructions can correspond to program codes for the various applications of the video game console 110 including video game application 140, music application 142, video application 144, social media application 146, and news application 148. A video game application, such as video game application 140, generally represents a computer application executable to present video game content, receive user interaction with the video game content, and accordingly update the video game content. A media application, such as music application 142, video application 144, social media application 146, and news application 148, generally represents a computer application executable to present media content including audio, video, and/or other media types, receive user interaction with the media content, and accordingly update the media content. The media content can be streamed from a remote content source or can be presented from local storage of the video game console 110. Further, other applications can be likewise included in the video game console 110, such as a chat application. The availability of a video game application, media application, and/or other type of computer application to the video game player 122 via the video game console 110 can depend on a user identifier of the video game player 122 (e.g., upon a login to the video game console 110, the availability of the computer applications can depend on the user identifier used in the login).

The video game console 110 also includes a menu application 150, a dashboard application 152, and a switcher application 154. The menu application 150 can present user interfaces (UIs) in a GUI of the display 130. One or more UIs of the UIs presented by the menu application 150 can facilitate logging into the video game console 110, guiding a login process for logging into the video game console 110, presenting information associated with logging into the video game console 110, and the like. For example, one UI of the UIs presented by the menu application 150 can present fields for entering account credentials (e.g., a user identifier and a password). In another example, another UI of the UIs presented by the menu application 150 can present information for creating a user profile account. In yet another example, a subset of UIs of the UIs presented by the menu application 150 can facilitate and/or guide an end user through a login process for logging into the video game console 110 and/or a user account associated with an entity providing the video game console 110. The dashboard application 152 can present an arrangement of interactive UI widgets in a dashboard page on the GUI. The switcher application 154 can present a ribbon of UI elements in a ribbon menu on the GUI to allow scrolling between different UI elements and switching between corresponding applications.

The video game controller 120 is an example of an input device. The video game controller 120 may allow the user 122 to interact with one or more GUIs presented by the video game console 110 on the display 130. For example, using one or more directional control inputs (e.g., a joystick and/or a directional pad) the user can navigate to and within various menus, dashboards, and UI elements. Other types of the input device are possible including, a keyboard, a touchscreen, a touchpad, a mouse, an optical system, a microphone, a camera, or other user devices suitable for receiving input of a user. For example, a microphone may allow the user 122 to interact with the GUIs using various voice commands. As another example, a camera may allow the user 122 to interact with the GUIs using various gesture commands.

Upon an execution of the video game application 140 by the video game console 110, a rendering process of the video game console 110 presents video game content (e.g., illustrated as a car race video game content) on the display 130. Upon user input from the video game controller 120 (e.g., a user push of a particular key or button), the rendering process also presents the menu 112. Additionally, or alternatively, the menu 112 may be presented as an initial landing page in response to a user powering-on the video game console 110 and/or waking the video game consol 110 from a suspended state. Depending on the user input, the menu 112 corresponds to the home UI page, a landing page, or the like. The menu 112 can be presented in a layer over the video game content.

Upon the presentation of the menu 112, the user control changes from the video game application 140 to the menu application 150. Upon receiving a user input from the video game controller 120 requesting interactions with the menu 112, an underlying application (e.g., the menu application 150, the dashboard application 152, or the switcher application 154 as applicable) supports such interactions by updating the menu 112 and launching any relevant application in the background or foreground. The video game player 122 can exit the menu 112 or automatically dismiss the menu 112 upon the launching of an application in the background or foreground. Upon exiting the menu 112 or the dismissal based on a background application launch, the user control changes from the underlying application to the video game application 140.

The dashboard application 152, when executed, may generate a dashboard (e.g., a "widget menu," "landing page," and/or "explore page") configured to present information from applications and services available to the video game console 110 as interactive UI widgets. The term "widget" is used herein as an example of an interactive UI element generated and/or presented by the dashboard application 152 and corresponding to an application or service of the computer system. Other implementations to present a UI element are possible, including any type of icon, whether a widget, a tile, a thumbnail, a text description, a multiple column element with textual or graphical description in each column, and the like. Widgets may be presented with application information and/or dynamic content presented with the widget in a media library. For example, the dashboard application 152 may generate and/or present widgets associated with media applications, system applications and/or services, video game applications, or the like. The dashboard application 152 may be executed via multiple avenues of ingress. For example, the dashboard application 152 may be executed by a pre-defined user interaction (e.g., via controller 120, a voice command from the video game player 122, activating and/or powering-on the video game consol 110 etc.) and/or by navigating one or more menus and/or sub-menus of the video game console 110 (e.g., menu 112).

In general, the switcher application 154 may facilitate selection of a first subset of tiles to present in an immediate selection area of a library interface, as described in more detail below. The switcher application 154 may populate the first subset of tiles with tiles associated with system applications, video game applications, other forms of content, etc.

Although FIG. 1 illustrates that the different applications are executed on the video game console 110, the embodiments of the present disclosure are not limited as such. Instead, the applications can be executed on the backend system (e.g., the cloud servers) and/or their execution can be distributed between the video game console 110 and the backend system.

In the interest of clarity of explanation, the embodiments may be described in connection with a video game system including a video game console. However, the embodiments are not limited as such and similarly apply to any other type of a computer system. Generally, a computer system presents a dashboard in a GUI on a display. The dashboard presents UI elements, each corresponding to an application, service, or collection of information.

Figure 2:
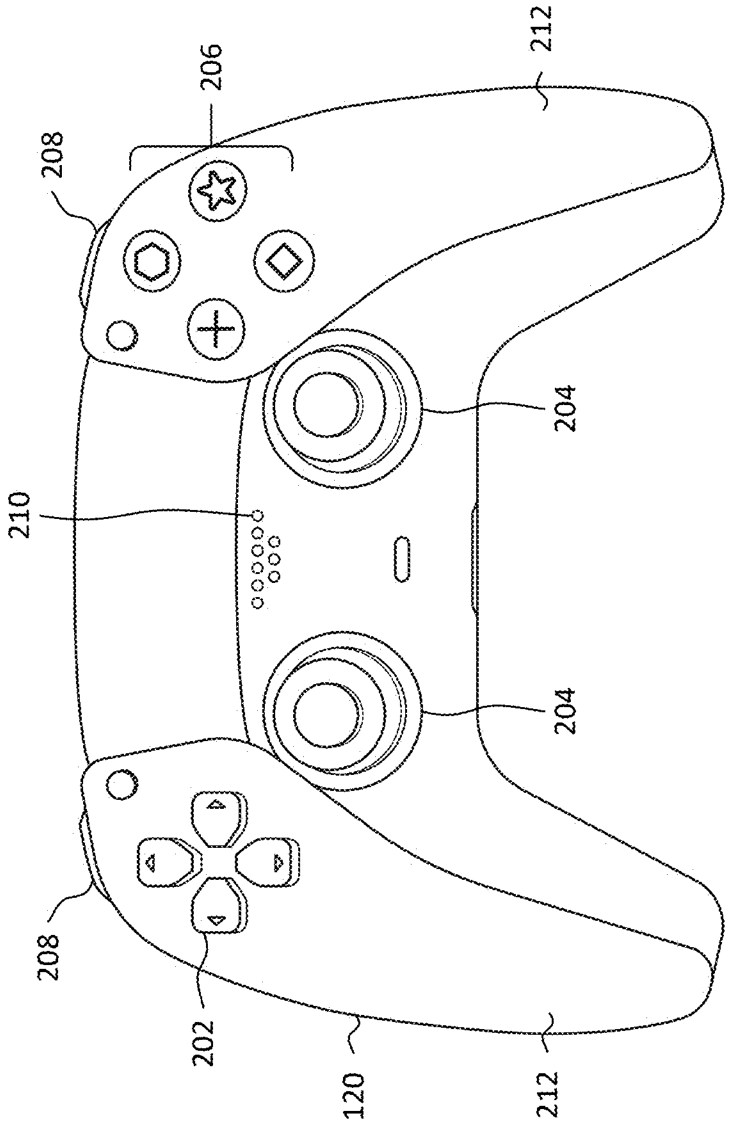
FIG. 2 illustrates an example of a video game controller, according to some embodiments of the present disclosure.

FIG. 2 illustrates an example of a video game controller. As shown in FIG. 2, the video game controller 120 can include mechanisms for providing input to the video game console 110. For example, the video game controller 120 can include a directional pad 202, joysticks 204, buttons 206, and triggers 208. Any combination of the directional pad 202, one or both of the joysticks 204, one or more of the buttons 206, and one or both of the triggers 208 can be used by an end user (e.g., a video game player) to provide input to the video game console 110. The video game controller 120 can also include handles 212, which can be used to hold or grip the video game controller 120 while an end user operates the video game controller 120 to provide the input the video game console 110. The video game controller 210 can also include ports 210 that enable audio transducers included in the video game controller 120 to record sounds in an environment surrounding the video game controller 120 and emit audio to the environment surrounding the video game controller 120. Although not shown, the video game controller 120 can include other components such as one or more touch sensors for detecting physical touching of the video game controller 120 (e.g., by a human, another video game controller, an electronic device, and the like), display screens for displaying content (e.g., control and video game content) and receiving input to the video game controller 120 (e.g., touchscreen input), light sources (e.g., light emitting diodes) for emitting light and other signals to the environment surrounding the video game controller 120, and the like. The foregoing mechanisms of the video game controller 120 are not intended to be limiting and other mechanisms may be included in the video game controller 120.

Figure 3:
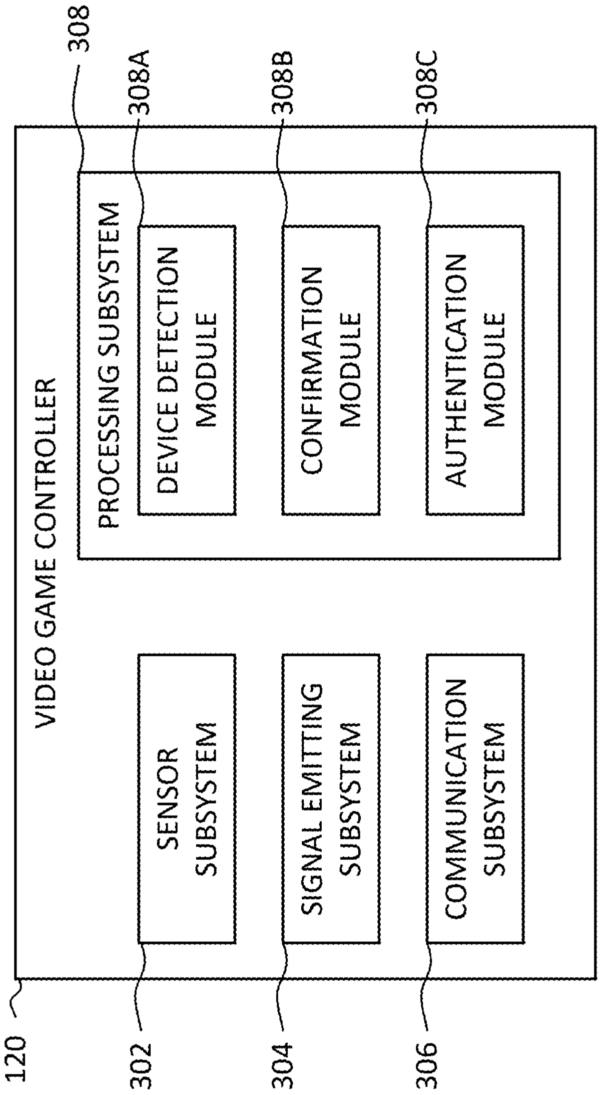
FIG. 3 illustrates another example of a video game controller, according to some embodiments of the present disclosure.

FIG. 3 illustrates another example of a video game controller. As shown in FIG. 3, the video game controller 120 can include a sensor subsystem 302, a signal emitting subsystem 304, and a communication subsystem 306, and a processing subsystem 308.

The sensor subsystem 302 can include sensors for sensing an operation of the video game controller 120, an external environment of the video game controller 120 (e.g., an environment surrounding the video game controller 120), an internal environment of the video game controller 120 (e.g., an environment within the video game controller 120), and the like. Examples of the sensors included in the sensor subsystem 302 can include, but are not limited to, image sensors, infrared sensors, depth cameras, event detection sensors, light sensors, microphones, sound sensors, audio transducers, position determining sensors, ultrawide band sensors, magnetic sensors, orientation sensors, proximity sensors, accelerometers, gyroscopes, inertial measurement units (IMUs), and the like.

The signal emitting subsystem 304 can include devices for emitting signals. A signal emitted by a device or devices of the signal emitting subsystem 304 can include a light component (e.g., visible and/or infrared light), an audible component (e.g., a sound), and/or a haptic feedback component (e.g., a vibration). Examples of light that can be included as a component of a signal emitted by a device or devices of the signal emitting subsystem 304 include visible light, infrared light, laser light, steady light, strobe light, flashing light, colored light, light patterns, light beams, modulated light, and the like. Examples of audio that can be included as a component of a signal emitted by a device or devices of the signal emitting subsystem 304 include sounds, noises, music, tones, chimes, songs, ringtones, variable volume audio, and the like. Examples of haptic feedback that can be included as a component of a signal emitted by a device or devices of the signal emitting subsystem 304 include vibrations, surface frictions, thermal feedback, electromagnetic feedback, ultrasonic feedback, and the like. Examples of devices included in the signal emitting subsystem 304 can include, but are not limited to, audio transducers such as speakers, light sources such as LEDs, haptic feedback devices such as a vibrator, and others.

The communication subsystem 306 can include various hardware such as circuitry, radios, modules, transceivers, and software for enabling the video game controller 120 to communicate using wireless and/or wired communication. For example, the various hardware and software can enable the video game controller 120 to communicate with a network, a cloud-based storage system, another device such as another video game controller, electronic device, mobile phone, input device, video game console, and the like. The various hardware and software can also enable the video game controller 120 to communication using any wired and/or wireless communication technology, standard, protocol, and the like, and using any kind of network, public or private, wired or wireless, and the like. Examples of such technologies, standards, and protocols include NFC, Bluetooth, IrDA; RFID; Matter; ZigBee; 3G; 4G; 5G; 6G; WLAN; Z-wave; Wi-Fi and Wi-Fi Direct; UWB; USB; ANT and ANT+; UHF; VHF; SCPS; and the like.

Figure 6:
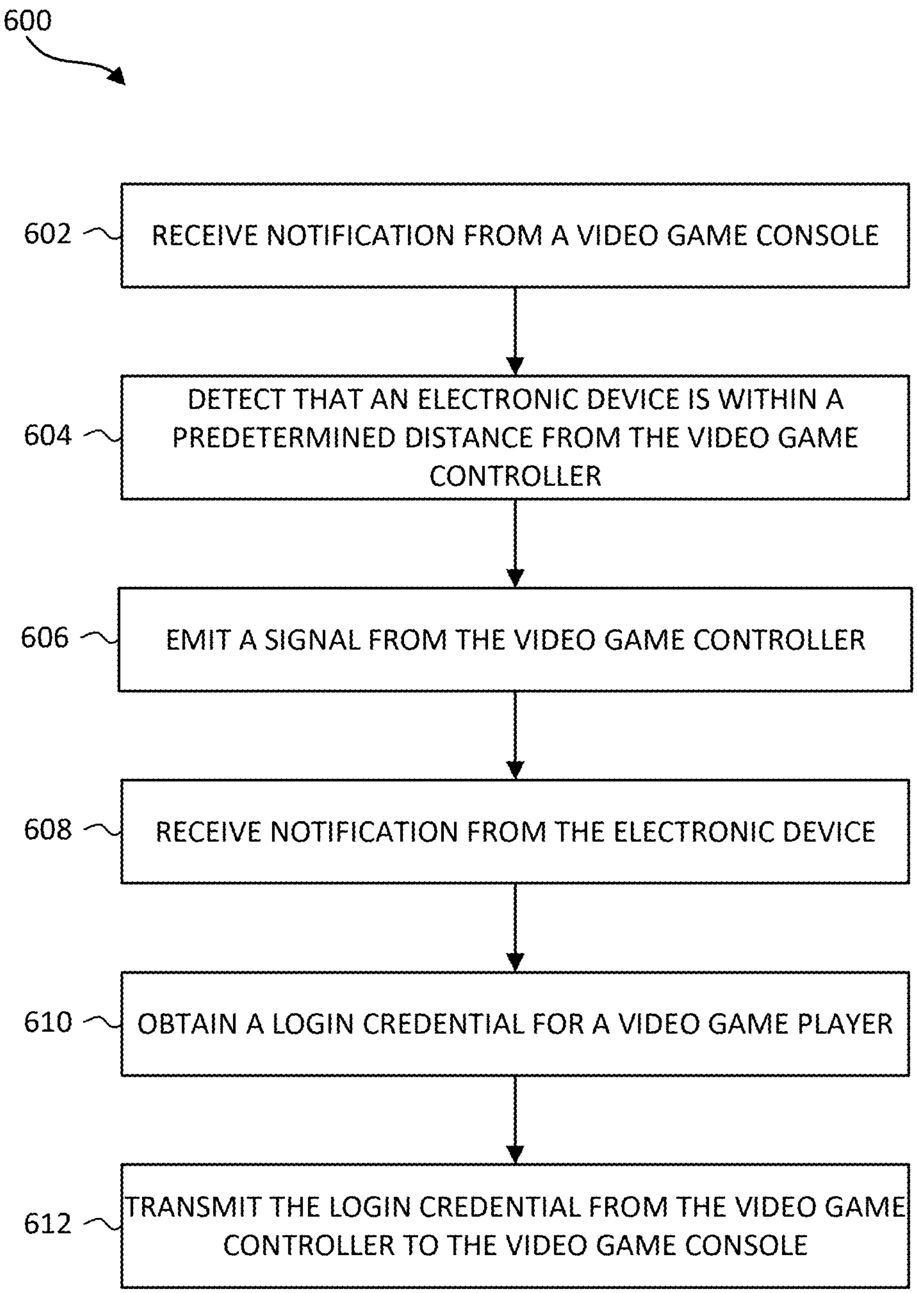
FIG. 6 depicts an example of a process for operating a video game controller to perform controller-driven video game console login, according to some embodiments of the present disclosure.

The processing subsystem 308 can include one or more processors (not shown) and one or more memories (not shown). The one or more processors can read one or more programs from the one or more memories and execute them. Each processor of the one or more processors can be of any type of processor. Examples of processors include, but are not limited to, microprocessors, microcontrollers, graphical processing units, digital signal processors, application-specific integrated circuits, field programmable gate arrays, or any combination thereof. Additionally, each processor of the one or more processors can include multiple cores, arrays, coprocessors, local cache memory layers, and the like. Each memory of the one or more memories can be non-volatile and can include any type of memory or memory device that retains stored information when powered off. At least one memory of the one or more memories can include a non-transitory computer-readable storage medium from which the one or more processors can read instructions. Examples of memories, memory devices, computer-readable storage media include, but are not limited to, include electrically erasable and programmable read-only memory, flash memory, magnetic disks, memory chips, read-only memory, RAM, an ASIC, a configured processor, optical storage, and the like. The one or more processors, either individually or collectively, can execute programs stored in the one or more memories to perform the operations and/or methods, including parts thereof, described throughout. For example, the one or more processors can execute programs stored in the one or more memories to perform the process 600 for operating a video game controller to perform controller-driven video game console login as shown in FIG. 6 below and to be described later.

In some implementations, the processing subsystem 308 can include, but is not limited to, a device detection module 308A, a confirmation module 308B, and an authentication module 308C. Each of the device detection module 308A, the confirmation module 308B, and the authentication module 308C can be implemented in hardware (e.g., a processor, computer circuitry, and the like), software, or a combination thereof.

The device detection module 308A can be configured to detect whether an electronic device is within a predetermined distance from the video game controller 120. Examples of electronic devices include, but not are not limited to, video game controllers, mobile phones, computing devices such as tablet computers, laptop computers, and the like, video game consoles, wearable devices, and the like. In some implementations, the predetermined distance can be 0, 1, 2, 3, 4, 5, 6, 7, 8, 9, 10, 11, or 12 inches or any distance therebetween. The device detection module 308A can detect that the electronic device is within the predetermined distance from the video game controller 120 by detecting a signal that is emitted from the electronic device. In some implementations, the device detection module 308A can detect that an electronic device is within a predetermined distance from the video game controller 120 in response to and/or after the video game controller 120 receives a notification. In some implementations, the signal can be an audio signal, a light signal, or a combination thereof.

In some implementations, in the case the electronic device emits an audio signal, the device detection module 308A can detect the emitted audio signal (e.g., using one or more audio transducers included in the sensor subsystem 302). In some implementations, to determine whether the electronic device is within the predetermined distance from the video game controller 120, the device detection module 308A can determine whether the audio signal emitted by the electronic device has a particular frequency and/or a particular amplitude. In the event that the audio signal emitted by the electronic device has the particular frequency and/or the particular amplitude, the device detection module 308A can determine that the electronic device is within the predetermined distance from the video game controller 120.

In some implementations, in the case the electronic device emits a light signal, the device detection module 308A can detect the emitted light signal (e.g., using one or more image sensors and/or light sensors of the sensor subsystem 302). In some implementations, to determine whether the electronic device is within the predetermined distance from the video game controller 120, the device detection module 308A can determine whether the light signal emitted by the electronic device has a particular frequency, a particular intensity (e.g., brightness), and/or a particular pattern. In the event that the light signal emitted by the electronic device has the particular frequency, the particular intensity, and/or the particular pattern, the device detection module 308A can determine that the electronic device is within the predetermined distance from the video game controller 120.

In some implementations, the device detection module 308A can detect that the electronic device is within the predetermined distance from the video game controller by detecting that the electronic device is communicating with the video game controller 120 using at least one of a Near Field Communication (NFC) protocol or a Bluetooth protocol. In some implementations, the video game controller can be wirelessly paired with and/or wirelessly coupled to the electronic device using the communication subsystem 306 and using a wireless pairing and/or coupling protocol such as the NFC protocol or Bluetooth protocol and the electronic device can be considered to be communicating with the video game controller 120 when the video game controller 120 is wirelessly paired with and/or wirelessly coupled to the electronic device. In some implementations, to determine whether the electronic device is within the predetermined distance from the video game controller 120, the device detection module 308A can determine whether the video game controller 120 is wirelessly paired with and/or wirelessly coupled to the electronic device using the NFC protocol and/or the Bluetooth protocol, and, in the event that the video game controller 120 detects that the video game controller 120 is wirelessly paired with and/or wirelessly coupled to the electronic device using the NFC protocol and/or the Bluetooth protocol, the device detection module 308A can determine that the electronic device is within the predetermined distance from the video game controller 120.

The device detection module 308A can also detect that the electronic device is within the predetermined distance from the video game controller 120 by detecting that the electronic device is in physical contact with the video game controller 120 and/or has physically contacted the video game controller 120. In some implementations, the electronic device can be brought into physical contact with the video game controller 120 and the device detection module 308A can detect the electronic device is in physical contact with and/or has physically contacted the video game controller 120. The device detection module 308A can detect whether the electronic device is in physical contact with and/or has physically contacted the video game controller 120 using one or more sensors of the sensor subsystem 302 (e.g., proximity sensors, IMUs) and/or a wireless communication transceiver (e.g., a Bluetooth-enabled radio, an NFC-enabled radio) of the communication subsystem 306. In some implementations, to determine whether the electronic device is in physical contact with and/or has physically contacted the video game controller 120, the device detection module 308A can obtain a signal from the wireless communication transceiver and use the signal obtained from the wireless communication transceiver to determine that an electronic device is within a close distance to the video game controller 120 (e.g., 0, 1, 3, 4 inches or anything distance therebetween). In the event the device detection module 308A determines that the electronic device is within a close distance to the video game controller 120, the device detection module 308A can obtain one or more signals from the one or more sensors and use the one or more signals obtained from the one or more sensors to determine that the electronic device is in physical contact with and/or has physically contacted the video game controller 120. For example, the device detection module 308A can obtain a signal from the wireless communication transceiver of the communication subsystem 306, use that signal to determine that the electronic device is within a close distance to the video game controller 120, obtain a signal from a proximity sensor of the sensor subsystem 302, and use that signal to determine that the electronic device is in physical contact with (e.g., touching) the video game controller 120. In another example, the device detection module 308A can obtain a signal from the wireless communication transceiver of the communication subsystem 306, use that signal to determine that the electronic device is within a close distance to the video game controller 120, obtain signals from an IMU of the sensor subsystem 306, and use those signals to determine that the electronic device has physically contacted the video game controller 120 while the electronic device is or was within a close distance to the video game controller 120.

The confirmation module 308B can be configured to receive notifications. In some implementations, the notifications can be received from a video game console such as the video game console 110. In some implementations, the notifications received from the video game console can indicate that a login event has occurred at the video game console. In some implementations, the login event can correspond to a login inquiry generated by the video game console for logging into the video game console, logging into a video game executing on the video game console, and logging into other components. In some implementations, the notifications can be received from an electronic device such as the electronic device described above. In some implementations, the notifications received from the electronic device can indicate that a signal emitted by the video game controller 120 was received by the electronic device. In some implementations, the notification can also indicate that an application associated with a provider of the video game console is executing on the electronic device. In some implementations, the notification can be generated automatically by the electronic device in response to receiving the signal emitted by the video game controller 120 while an application associated with a provider of the video game console 110 is executing on the electronic device. In some implementations, the notification can be generated by the electronic device in response to an end user acknowledging the signal emitted by the video game controller 120 while using an application associated with a provider of the video game console that is executing on the electronic device and during a time in which the signal is emitted by the video game controller 120.

As described above the video game controller 120 can be configured to communicate using wireless communications and/or wired communications. In the case, the video game console is wirelessly coupled to the video game controller 120 or the electronic device, the confirmation module 308B can receive the notifications using a wireless transceiver of the communication subsystem 306. In the case the video game console is couple to the video game controller 120 or the electronic device using a wired connection, the confirmation module 308B can receive the notifications using a wired transceiver of the communication subsystem 306.

The confirmation module 308B can be configured to emit signals. In some implementations, the signal can be an audible signal (e.g., a sound output by an audio transducer of the signal emitting subsystem 304), a visual signal (e.g., a light emitted by a light source of the signal emitting subsystem 304), a vibration signal (e.g., a rumble emitted by a vibrator of the signal emitting subsystem 304), or a combination thereof. In some implementations, the signal can be emitted in response to the device detection module 308A detecting that an electronic device is within a predetermined distance from the video game controller 120.

The authentication module 308C can be configured to obtain a login credential for a video game player. In some implementations, the video game player can be an end user of the video game console, an end user of the electronic device, an end user of the video game controller 120, or a combination thereof. In some implementations, the video game player can be human video game player or computerized (e.g., artificially intelligent) video game player. In some implementations, the login credential for the video game player can be obtained from a server (e.g., a cloud-based storage server) storing login credentials for video game players, the electronic device, or a combination thereof. For example, the authentication module 308C can use a wireless or wired transceiver of the communication subsystem 306 to communicate with the server and/or the electronic device to obtain the login credential for the video game player from the server and/or the electronic device. In some implementations, the login credential can facilitate logging into the video game controller 120, the video game console, the electronic device, an application associated with a provider of the video game console that is installed on and/or executing on the electronic device, or a combination thereof. In some implementations, the authentication module 308C can obtain the login credential in response to and/or after a notification is received from the electronic device.

The authentication module 308C can also be configured to can transmit the login credential to the video game console. In some implementations, transmitting of the login credential serves as a response to the login event. The authentication module 308C can transmit the login credential to the video game console using a wireless communication transceiver of the communication subsystem 306. In some implementations, the login credential can be used by the video game console 110 to log into the video game console 110, log into a video game executing on the video game console 110, authenticate an end user or video game player, retrieve video game player settings, video game player preferences, video game statistics, and other data and information associated with video games, video game players, and/or video game consoles.

The foregoing subsystems of the video game controller 120 are not intended to be limiting and other subsystems may be included in the video game controller 120.

FIGS. 4A-4E illustrates an example of a controller-driven video game console login flow. In some implementations, the controller-driven video game console login flow can be performed by the video game controller 110.

Figure 4A:
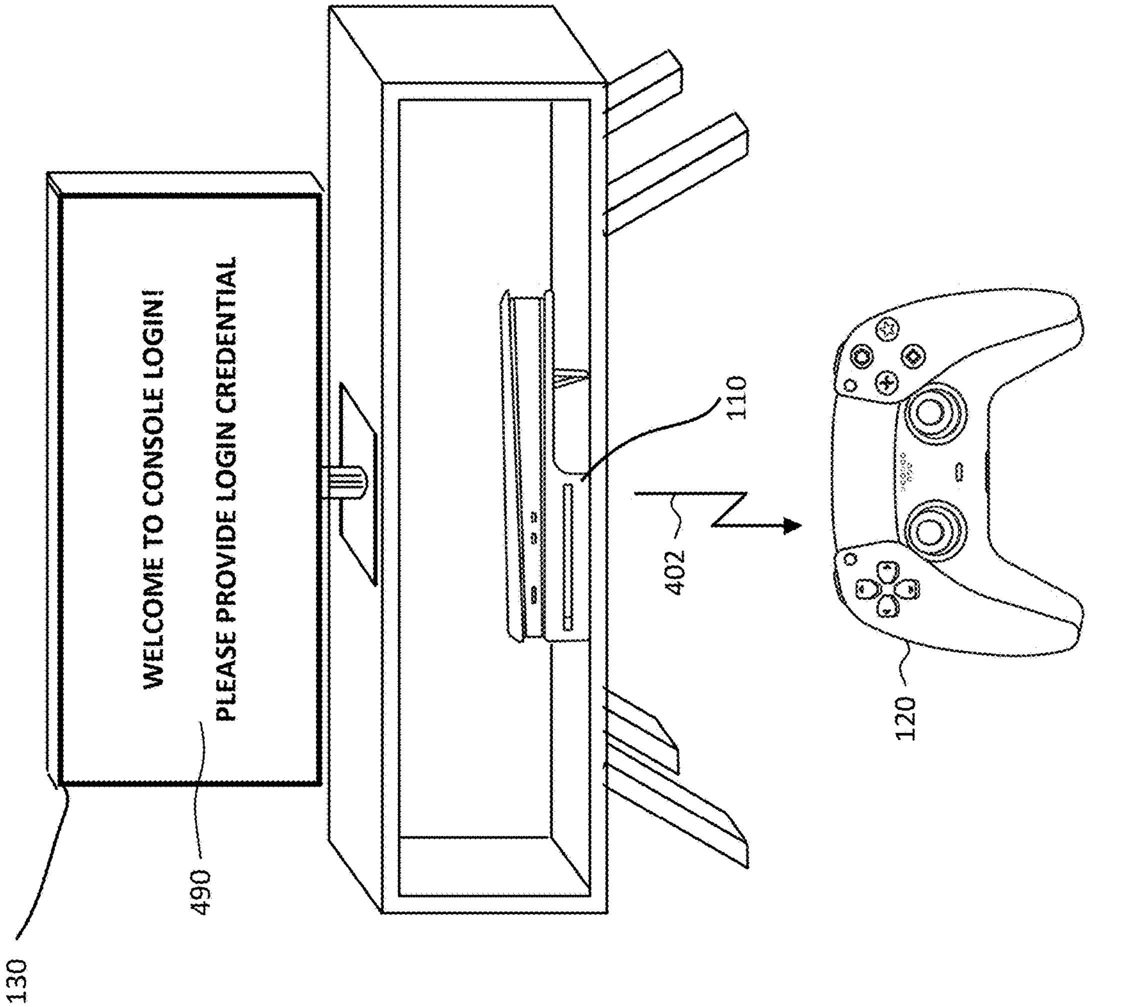
FIGS. 4A-4E illustrates an example of a controller-driven video game console login flow, according to some embodiments of the present disclosure.

As shown in FIG. 4A, the flow begins with a login event that has occurred at the video game console 110. In some implementations, the login event corresponds to a login inquiry generated by the video game console 110 for logging into the video game console and/or for logging into a video game executing on the video game console 110. For example, the video game console 110 can generate a GUI 490 and present the GUI 490 on the display 130. The GUI 490 can present the login inquiry generated by the video game console 110 for logging into the video game console and/or for logging into a video game executing on the video game console 110. After the login event has occurred and/or in response to the login event occurring, the video game console 110 can transmit a notification 402 to the video game controller 120.

Figure 4B:
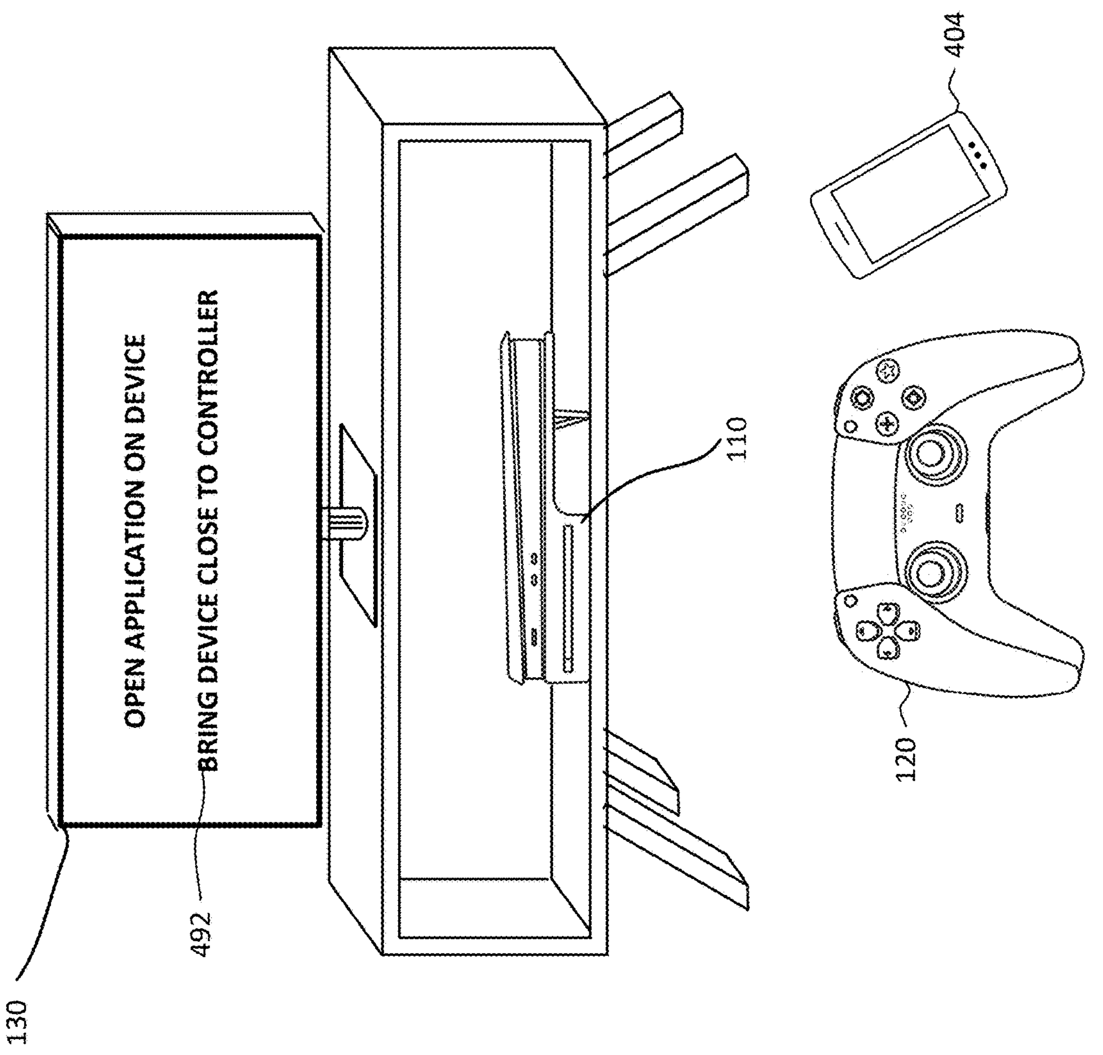

As shown in FIG. 4B, after transmitting the notification 402 and/or in response to transmitting the notification 402, the video game console 110 can generate a GUI 492 and present the GUI 492 on the display 130. The GUI 492 can present an instruction associated with the login inquiry. For example, as shown in FIG. 4B, the instruction can instruct a viewer of the display 130 (e.g., a video game player or end user of the video game controller) to open an application installed on their electronic device 404 and bring electronic device 404 close to the video game controller 120.

Figure 4C:
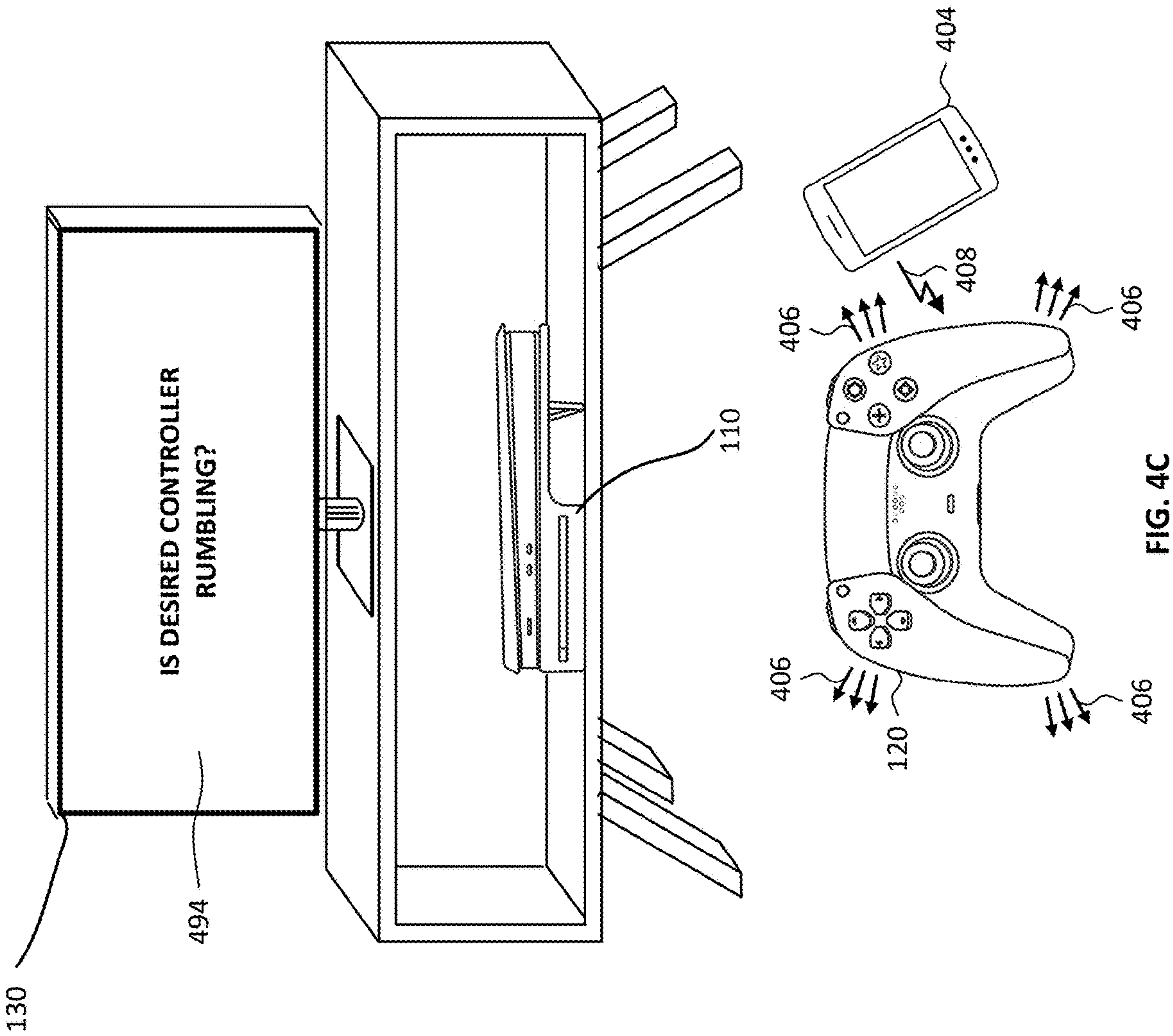

As shown in FIG. 4C, the video game controller 120 can detect that an electronic device 404 is within a predetermined distance from the video game controller and emit a signal 406 after the detection and/or in response to the detection. The signal can serve as an indicator that the electronic device 404 is close to the video game controller 120. As shown in FIG. 4C, the signal 406 is a visual signal, but, as described throughout, this is not intended to be limiting, and any kind of signal can be emitted to serve as a confirmation that the electronic device 404 is close to the video game controller 120. After generating and presenting the GUI 492, the video game console 110 can generate and present GUI 494. The GUI 494 can present an inquiry associated with the emitted signal. For example, in the case the emitted signal is a vibration, the video game console 110 can present an inquiry associated with the vibration (e.g., "Is desired controller rumbling?"). After the video game controller 110 emits the signal and/or in response to the video game controller 110 emitting the signal, the electronic device 404 can transmit a notification 408 to the video game controller 120. The notification 408 can indicate that the signal emitted by the video game controller 120 was received by the electronic device 404. In some implementations, the notification can also indicate that an application associated with a provider of the video game console 120 is executing on the electronic device 404. In some implementations, the notification can be generated automatically by the electronic device 404 in response to receiving the signal while an application associated with a provider of the video game console 110 is executing on the electronic device 404. In some implementations, the notification can be generated by the electronic device 404 in response to an end user acknowledging the signal while using an application associated with a provider of the video game console 110 that is executing on the electronic device and during a time in which the signal is emitted by the video game controller 120.

Figure 4D:
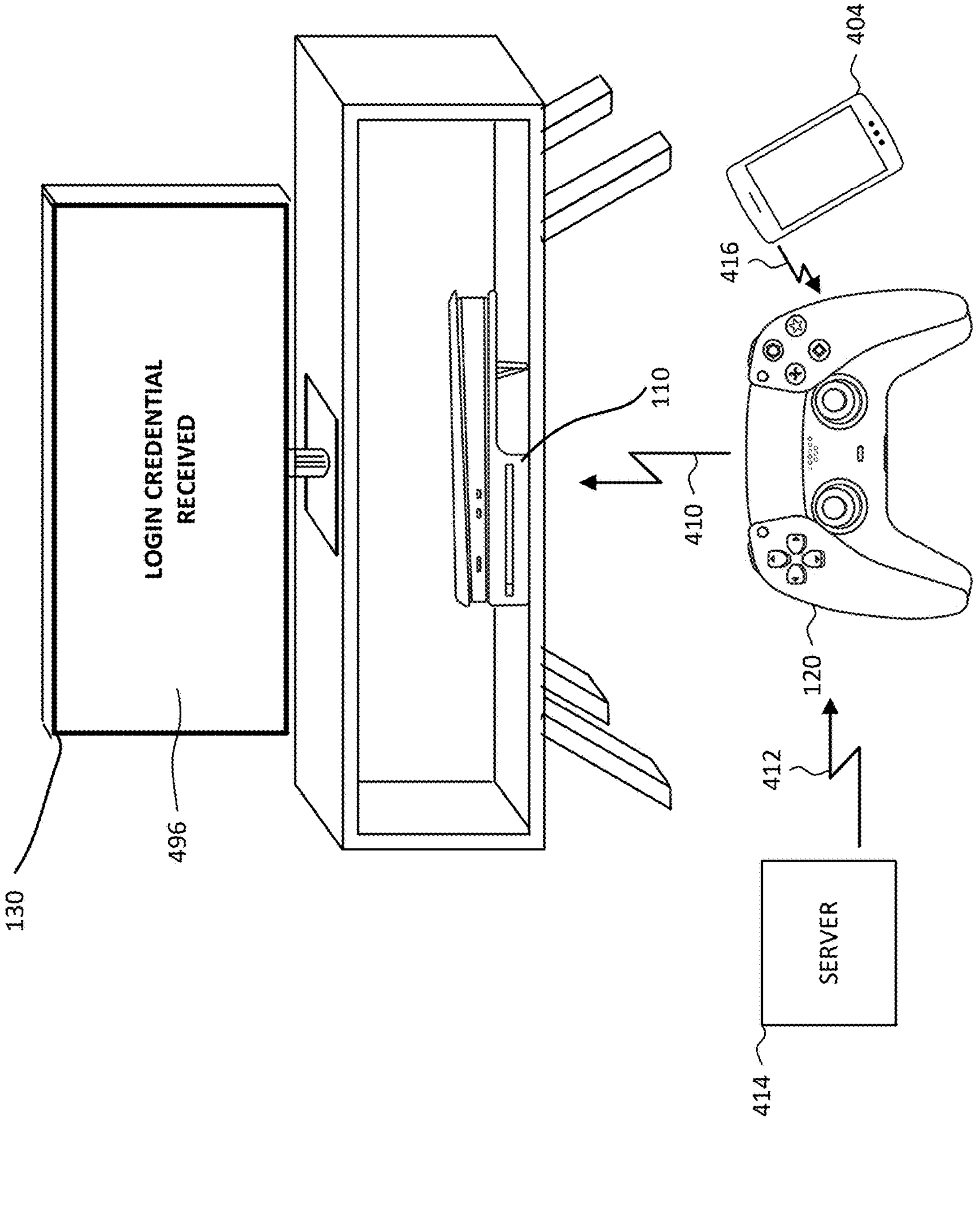
Figure 4E:
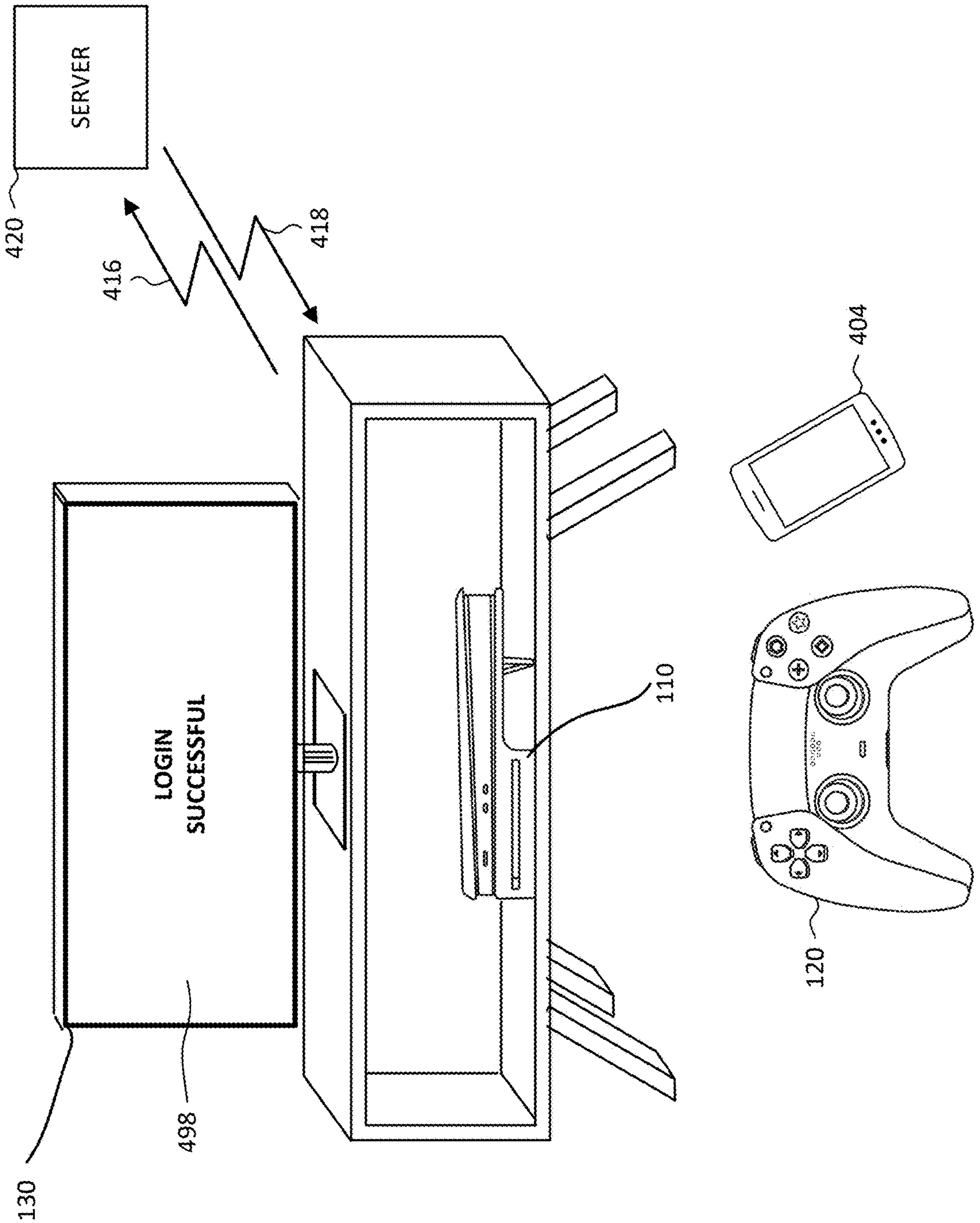
Figure 5:
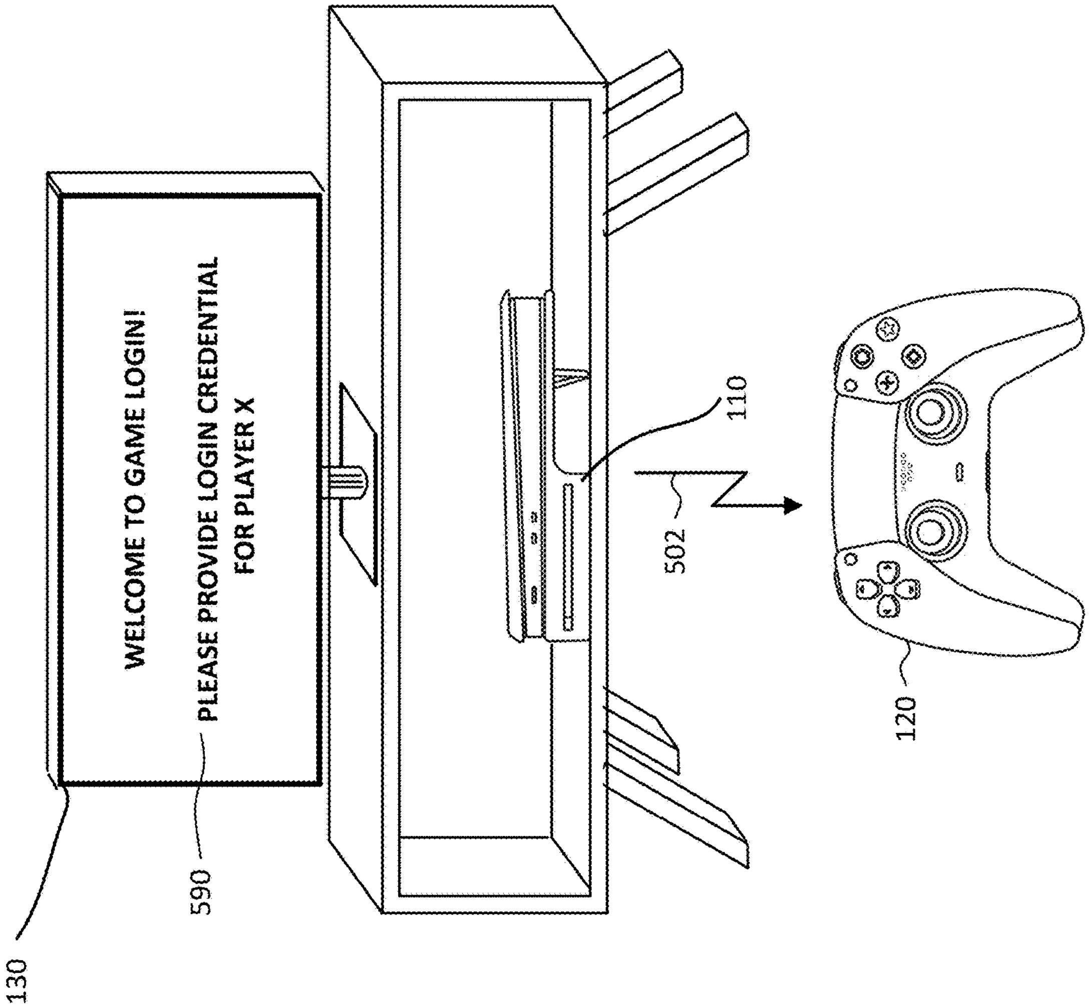
FIG. 5 illustrates another example of a controller-driven video game console login flow, according to some embodiments of the present disclosure.

As shown in FIG. 4D, after receiving and/or in response to receiving the notification 408 from the electronic device 404, the video game controller 120 can obtain a login credential for a video game player. For example, the login credential for the video game player can be obtained from a server 414 (e.g., a cloud-based storage server that store login credentials for video game players) which transmits a message 412 to the video game controller 120 that includes the login credential. In another example, the login credential for the video game player can be obtained from the electronic device 404 which transmits a message 416 to the video game controller 120 that includes the login credential. In some implementations, the login credential can facilitate logging into the video game controller, the video game console, the electronic device, an application associated with a provider of the video game console that is installed on and/or executing on the electronic device, or a combination thereof. After receiving and/or in response to receiving the login credential, the video game controller 120 can transmit a message 410 that includes the login credential to the video game console 110. After receiving and/or in response to receiving the login credential, the video game console 110 can generate a GUI 496 and present the GUI 496 on the display 130. The GUI 496 can present a message that indicates that the login credential was received.

As shown in FIG. 4D, after receiving and/or in response to receiving the message 410 that includes the login credential from the video game controller 120, the video game console 110 can perform a login event. In some implementations, to perform the login event, the video game console 110 can verify the login event by transmitting a message 416 to a server 120 (e.g., a cloud-based server with a credential authentication service) and receiving a message 418 from the server 418 that indicates that the login credentials are authenticated and/or valid. In some implementations, the login credential can be used by the video game console to log into the video game console, log into a video game executing on the video game console, authenticate an end user or video game player, retrieve video game player settings, video game player preferences, video game statistics, and other data and information associated with video games, video game players, and/or video game consoles. After authenticating and/or validating the login credential, the video game console 110 can generate a GUI 498 and present the GUI 498 on the display 130. The GUI 498 can present a message that indicates that a login was successful. In some implementations, the message can serve as a response to the login event.

As described above, the login event can correspond to a login inquiry generated by the video game console 110 for logging into the video game console and/or for logging into a video game executing on the video game console 110. However, this is not intended to be limiting, and the login event can correspond to login inquiry generated by the video game console 110 for adding a video game player to a video game that is already in progress. For example, a first video game player may be using the video game console 110 to play a video game and may wish to add a second video game player. In this case, the video game console 110 can generate a GUI 590 and present the GUI 590 on the display 130. The GUI 590 can present the login inquiry for adding the video game player to the video game. After the login event has occurred and/or in response to the login event occurring, the video game console 110 can transmit a notification 502 to the video game controller 120. The video game controller 120 can then continue the flow as described with respect to FIGS. 4B-4E. In this way, video game players can be seamlessly added without interrupting video game play and without negatively impacting performance of the video game console.

FIG. 6 depicts an example of a process 600 for operating a video game controller to perform controller-driven video game console login. The process depicted in FIG. 6 may be implemented in software (e.g., code, instructions, program) executed by one or more processing units (e.g., processors, cores) of the respective systems, hardware, or combinations thereof. The software may be stored on one or more non-transitory storage media (e.g., on a memory device). The process shown in FIG. 6 and described below is intended to be illustrative and non-limiting. Although FIG. 6 depicts the various steps occurring in a particular sequence or order, this is not intended to be limiting. In certain alternative embodiments, the steps may be performed in some different order or some steps may also be performed in parallel. In certain embodiments, such as in the embodiments depicted in FIGS. 1-5, the process shown FIG. 6 may be performed by the video game controller 120.

At block 602, the video game controller receives a notification from a video game console. The notification can indicate that a login event has occurred at the video game console. In some implementations, the login event corresponds to a login inquiry generated by the video game console for logging into the video game console and/or for logging into a video game executing on the video game console. In some implementations, the video game console is wirelessly coupled to the video game controller.

At block 604, the video game controller detects that an electronic device is within a predetermined distance from the video game controller. In some implementations, the predetermined distance can be 0, 1, 2, 3, 4, 5, 6, 7, 8, 9, 10, 11, or 12 inches or any distance therebetween.

In some implementations, the video game controller can detect that the electronic device is within the predetermined distance from the video game controller by detecting a signal that is emitted from the electronic device. In some implementations, the signal can be an audio signal, a light signal, or a combination thereof. In some implementations, in the case the electronic device emits an audio signal, the video game controller can detect the emitted audio signal (e.g., using one or more audio transducers of the video game controller). In some implementations, to determine whether electronic device is within the predetermined distance from the video game controller, the video game controller can determine whether the audio signal emitted by the electronic device has a particular frequency and/or a particular amplitude. In the event that the audio signal emitted by the electronic device has the particular frequency and/or the particular amplitude, the video game controller can determine that the electronic device is within the predetermined distance from the video game controller. While the foregoing has been described with respect to a particular frequency and/or a particular amplitude, this is not intended to be limiting, and any audio feature such as tone, melody, harmony, and the like can be used in determining whether the electronic device is within the predetermined distance. In some implementations, in the case the electronic device emits a light signal, the video game controller can detect the emitted light signal (e.g., using one or more image sensors and/or light sensors of the video game controller). In some implementations, to determine whether electronic device is within the predetermined distance from the video game controller, the video game controller can determine whether the light signal emitted by the electronic device has a particular frequency, a particular intensity (e.g., brightness), and/or a particular pattern. In the event that the light signal emitted by the electronic device has the particular frequency, the particular intensity, and/or the particular pattern, the video game controller can determine that the electronic device is within the predetermined distance from the video game controller. While the foregoing has been described with respect to a particular frequency, a particular intensity, and particular pattern, this is not intended to be limiting, and any light feature such as an image, projection, hologram, and the like can be used in determining whether the electronic device is within the predetermined distance.

In some implementations, the video game controller can detect that the electronic device is within the predetermined distance from the video game controller by detecting that the electronic device is communicating with the video game controller using at least one of a Near Field Communication (NFC) protocol or a Bluetooth protocol. In some implementations, the video game controller can be wirelessly paired with and/or wirelessly coupled to the electronic device using a wireless pairing and/or coupling protocol such as the NFC protocol or Bluetooth protocol and the electronic device can be considered to be communicating with the video game controller when the video game controller is wirelessly paired with and/or wirelessly coupled to the electronic device. In some implementations, to determine whether the electronic device is within the predetermined distance from the video game controller, the video game controller can determine whether the video game controller is wirelessly paired with and/or wirelessly coupled to the electronic device using the NFC protocol and/or the Bluetooth protocol, and, in the event that the video game controller detects that the video game controller is wirelessly paired with and/or wirelessly coupled to the electronic device using the NFC protocol and/or the Bluetooth protocol, the video game controller can determine that the electronic device is within the predetermined distance from the video game controller. While the foregoing has been described with respect to the NFC and Bluetooth protocols, this is not intended to be limiting, and any wireless communication protocol capable of wirelessly pairing and/or wirelessly coupling a video game controller and an electronic device can be used in determining whether the electronic device is within the predetermined distance.

In some implementations, the video game controller can detect that the electronic device is within the predetermined distance from the video game controller by detecting that the electronic device is in physical contact with the video game controller and/or has physically contacted the video game controller. In some implementations, the electronic device can be brought into physical contact with the video game controller and the video game controller can detect the electronic device is in physical contact with and/or has physically contacted the video game controller. The video game controller can detect whether the electronic device is physical contact with and/or has physically contacted the video game controller using one or more sensors (e.g., proximity sensors, IMUs) and/or a wireless communication transceiver (e.g., a Bluetooth-enabled radio, an NFC-enabled radio). In some implementations, to determine whether the electronic device is in physical contact with and/or has physically contacted the video game controller, the video game controller can obtain a signal from the wireless communication transceiver and use the signal obtained from the wireless communication transceiver to determine that an electronic device is within a close distance to the video game controller (e.g., 0, 1, 3, 4 inches or anything distance therebetween). In the event the video game controller determines that the electronic device is within a close distance to the electronic device, the video game controller can obtain one or more signals from the one or more sensors and use the one or more signals obtained from the one or more sensors to determine that the electronic device is in physical contact with and/or has physically contacted the video game controller. For example, in the case of a proximity sensor, the video game controller can obtain a signal from the wireless communication transceiver, use that signal to determine that the electronic device is within a close distance to the video game controller, obtain a signal from the proximity sensor, and use that signal to determine that the electronic device is in physical contact with (e.g., touching) the video game controller. In another example, in the case of an IMU, the video game controller can obtain a signal from the wireless communication transceiver, use that signal to determine that the electronic device is within a close distance to the video game controller, obtain signals from the IMUs, and use those signals to determine that the electronic device has physically contacted the video game controller while the electronic device is or was within the close distance to the video game controller.

At block 606, the video game controller can emit a signal. In some implementations, the signal can be an audible signal (e.g., a sound output by an audio transducer of the video game controller), a visual signal (e.g., a light emitted by a light source of the video game controller), a vibration signal (e.g., a rumble emitted by a vibrator of the video game controller), or a combination thereof.

At block 608, the video game controller receives a notification from the electronic device. The second notification can indicate that the signal emitted by the video game controller was received by the electronic device. In some implementations, the second notification can also indicate that an application associated with a provider of the video game console is executing on the electronic device. In some implementations, the second notification can be generated automatically by the electronic device in response to receiving the signal while an application associated with a provider of the video game console is executing on the electronic device. In some implementations, the second notification can be generated by the electronic device in response to an end user acknowledging the signal while using an application associated with a provider of the video game console that is executing on the electronic device and during a time in which the signal is emitted by the video game controller.

At block 610, the video game controller can obtain a login credential for a video game player. In some implementations, the video game player can be an end user of the video game console, an end user of the electronic device, an end user of the video game controller, or a combination thereof. In some implementations, the video game player can be human video game player or computerized (e.g., artificially intelligent) video game player. In some implementations, the login credential for the video game player can be obtained from a server (e.g., a cloud-based storage server) storing login credentials for video game players, the electronic device, or a combination thereof. In some implementations, the login credential can facilitate logging into the video game controller, the video game console, the electronic device, an application associated with a provider of the video game console that is installed on and/or executing on the electronic device, or a combination thereof.

At block 612, the video game controller can transmit the login credential to the video game console. In some implementations, transmitting of the login credential serves as a response to the login event. The video game controller can transmit the login credential to the video game console using a wireless communication transceiver of the video game controller. In some implementations, the login credential can be used by the video game console to log into the video game console, log into a video game executing on the video game console, authenticate an end user or video game player, retrieve video game player settings, video game player preferences, video game statistics, and other data and information associated with video games, video game players, and/or video game consoles.

Figure 7:
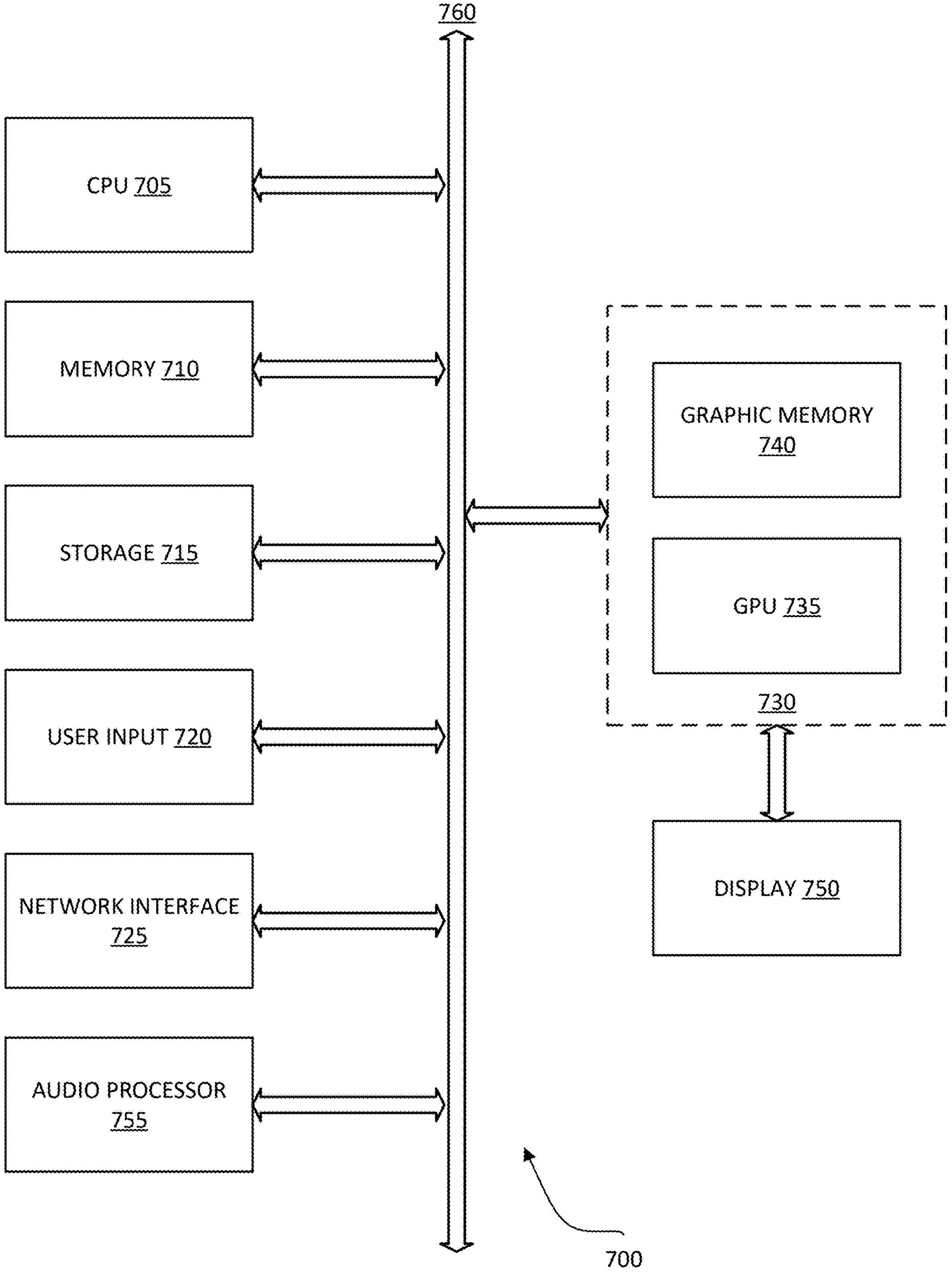
FIG. 7 illustrates an example of a computer system suitable for implementing techniques of the present disclosure, according to some embodiments of the present disclosure.

FIG. 7 illustrates an example of a computer system 700 suitable for implementing techniques of the present disclosure. The computer system 700 represents, for example, a user device (e.g., a touchscreen device or any other device described herein, above), a video game system, a backend set of servers, or other types of a computer system. The computer system 700 includes a central processing unit (CPU) 705 for running software applications and optionally an operating system. The CPU 705 may be made up of one or more homogeneous or heterogeneous processing cores. Memory 710 stores applications and data for use by the CPU 705 (including possible any of the AI models and any program codes of applications described herein above). Storage 715 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media (and may store any of the training data and/or user data described herein above). User input devices 720 communicate user inputs from one or more users to the computer system 700, examples of which may include keyboards, mice, joysticks, touch pads, touch screens, still or video cameras, and/or microphones. Network interface 725 allows the computer system 700 to communicate with other computer systems (including ones hosting any of the AI models described herein) via an electronic communications network and may include wired or wireless communication over local area networks and wide area networks such as the Internet. An audio processor 755 is adapted to generate analog or digital audio output from instructions and/or data provided by the CPU 705, memory 710, and/or storage 715. The components of computer system 700, including the CPU 705, memory 710, data storage 715, user input devices 720, network interface 725, and audio processor 755 are connected via one or more data buses 760.

A graphics subsystem 730 is further connected with the data bus 760 and the components of the computer system 700. The graphics subsystem 730 includes a graphics processing unit (GPU) 735 and graphics memory 740. The graphics memory 740 includes a display memory (e.g., a frame buffer) used for storing pixel data for each pixel of an output image. The graphics memory 740 can be integrated in the same device as the GPU 735, connected as a separate device with the GPU 735, and/or implemented within the memory 710. Pixel data can be provided to the graphics memory 740 directly from the CPU 705. Alternatively, the CPU 705 provides the GPU 735 with data and/or instructions defining the desired output images, from which the GPU 735 generates the pixel data of one or more output images. The data and/or instructions defining the desired output images can be stored in the memory 710 and/or graphics memory 740. In an embodiment, the GPU 735 includes 3D rendering capabilities for generating pixel data for output images from instructions and data defining the geometry, lighting, shading, texturing, motion, and/or camera parameters for a scene. The GPU 735 can further include one or more programmable execution units capable of executing shader programs.

The graphics subsystem 730 periodically outputs pixel data for an image from the graphics memory 740 to be displayed on the display device 750. The display device 750 can be any device capable of displaying visual information in response to a signal from the computer system 700, including CRT, LCD, plasma, and OLED displays. The computer system 700 can provide the display device 750 with an analog or digital signal.

In accordance with various embodiments, the CPU 705 is one or more general-purpose microprocessors having one or more processing cores. Further embodiments can be implemented using one or more CPUs 705 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

As used herein, when an action is "based on" something, this means the action is based at least in part on at least a part of the something. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 7, and 8 percent.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

receiving a first notification from a video game console, the first notification indicating that a login event has occurred at the video game console, wherein the video game console is wirelessly coupled to a video game controller;

based on the first notification, detecting that an electronic device is within a predetermined distance from the video game controller, wherein the electronic device comprises a mobile device of a user operating the video game controller;

based on detecting that the electronic device is within the predetermined distance from the video game controller, emitting a signal from the video game controller;

receiving a second notification from the electronic device, the second notification indicating that the signal was received by the electronic device;

based on the second notification, obtaining a login credential for a video game player; and transmitting the login credential from the video game controller to the video game console, wherein the transmitting of the login credential serves as a response to the login event.

2. The method of claim 1, wherein detecting that the electronic device is within the predetermined distance from the video game controller comprises detecting a signal emitted from the electronic device.

3. The method of claim 1, wherein detecting that the electronic device is within the predetermined distance from the video game controller comprises detecting that the electronic device is communicating with the video game controller using at least one of a Near Field Communication (NFC) protocol or a Bluetooth protocol.

4. The method of claim 1, wherein detecting that the electronic device is within the predetermined distance from the video game controller comprises detecting that the electronic device has physically contacted the video game controller.

5. The method of claim 1, wherein the second notification further indicates that an application associated with a provider of the video game console is executing on the electronic device.

6. The method of claim 1, wherein the signal comprises at least one of an audible signal emitted from an audio transducer of the video game controller, a visual signal emitted from a light emitting unit of the video game controller, a vibration signal emitted from a vibrating unit of the video game controller, or a combination thereof.

7. The method of claim 1, wherein obtaining the login credential for the video game player comprises obtaining the login credential from at least one of a server storing login credentials for video game players or the electronic device.

8. A system comprising:

one or more processors; and one or more computer-readable media storing instructions which, when executed by the one or more processors, cause the system to perform operations comprising:

receiving a first notification from a video game console, the first notification indicating that a login event has occurred at the video game console, wherein the video game console is wirelessly coupled to a video game controller;

based on the first notification, detecting that an electronic device is within a predetermined distance from the video game controller, wherein the electronic device comprises a mobile device of a user operating the video game controller;

based on detecting that the electronic device is within the predetermined distance from the video game controller, emitting a signal;

receiving a second notification from the electronic device, the second notification indicating that the signal was received by the electronic device;

based on the second notification, obtaining a login credential for a video game player; and transmitting the login credential to the video game console, wherein the transmitting of the login credential serves as a response to the login event.

9. The system of claim 8, wherein detecting that the electronic device is within the predetermined distance from the video game controller comprises detecting a signal emitted from the electronic device.

10. The system of claim 8, wherein detecting that the electronic device is within the predetermined distance from the video game controller comprises detecting that the electronic device is communicating with the video game controller using at least one of a Near Field Communication (NFC) protocol or a Bluetooth protocol.

11. The system of claim 8, wherein detecting that the electronic device is within the predetermined distance from the video game controller comprises detecting that the electronic device has physically contacted the video game controller.

12. The system of claim 8, wherein the second notification further indicates that an application associated with a provider of the video game console is executing on the electronic device.

13. The system of claim 8, wherein the signal comprises at least one of an audible signal emitted from an audio transducer of the video game controller, a visual signal emitted from a light emitting unit of the video game controller, a vibration signal emitted from a vibrating unit of the video game controller, or a combination thereof.

14. The system of claim 8, wherein obtaining the login credential for the video game player comprises obtaining the login credential from at least one of a server storing login credentials for video game players or the electronic device.

15. One or more non-transitory computer-readable media storing computer-readable instructions that, when executed by one or more processors, cause the one or more processors to perform operations comprising:

receiving a first notification from a video game console, the first notification indicating that a login event has occurred at the video game console, wherein the video game console is wirelessly coupled to a video game controller;

based on the first notification, detecting that an electronic device is within a predetermined distance from the video game controller, wherein the electronic device comprises a mobile device of a user operating the video game controller;

based on detecting that the electronic device is within the predetermined distance from the video game controller, emitting a signal from the video game controller;

receiving a second notification from the electronic device, the second notification indicating that the signal was received by the electronic device;

based on the second notification, obtaining a login credential for a video game player; and transmitting the login credential from the video game controller to the video game console, wherein the transmitting of the login credential serves as a response to the login event.

16. The one or more non-transitory computer-readable media of claim 15, wherein detecting that the electronic device is within the predetermined distance from the video game controller comprises detecting a signal emitted from the electronic device.

17. The one or more non-transitory computer-readable media of claim 15, wherein detecting that the electronic device is within the predetermined distance from the video game controller comprises detecting that the electronic device is communicating with the video game controller using at least one of a Near Field Communication (NFC) protocol or a Bluetooth protocol.

18. The one or more non-transitory computer-readable media of claim 15, wherein detecting that the electronic device is within the predetermined distance from the video game controller comprises detecting that the electronic device has physically contacted the video game controller.

19. The one or more non-transitory computer-readable media of claim 15, wherein the second notification further indicates that an application associated with a provider of the video game console is executing on the electronic device.

20. The one or more non-transitory computer-readable media of claim 15, wherein the signal comprises at least one of an audible signal emitted from an audio transducer of the video game controller, a visual signal emitted from a light emitting unit of the video game controller, a vibration signal emitted from a vibrating unit of the video game controller, or a combination thereof.

* * * * *